United States Patent
Chopra et al.

(10) Patent No.: US 9,058,241 B2
(45) Date of Patent: *Jun. 16, 2015

(54) SYSTEM AND METHOD FOR APPLICATION CONFIGURATION COMPARISON AND REUSE

(71) Applicant: International Business Machines Corporation, Armonk, NY (US)

(72) Inventors: Rajesh Chopra, Union, NJ (US); SweeFen Goh, Hartsdale, NY (US); Richard Thomas Goodwin, Dobbs Ferry, NY (US); Anca-Andreea Ivan, San Jose, CA (US); Stephen K. Kibby, Carlsbad, CA (US); Rakesh Mohan, Cortlandt Manor, NY (US); Igor Naumov, Plano, TX (US); Thomas Dean Rosinski, Frisco, TX (US); George A. Schroeder, Port Murray, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,655

(22) Filed: Feb. 5, 2013

(65) Prior Publication Data

US 2013/0174123 A1 Jul. 4, 2013

Related U.S. Application Data

(63) Continuation of application No. 12/043,440, filed on Mar. 6, 2008, now Pat. No. 8,495,620.

(51) Int. Cl.
*G06F 9/445* (2006.01)
*G06F 9/44* (2006.01)
*G06Q 10/06* (2012.01)

(52) U.S. Cl.
CPC . *G06F 8/71* (2013.01); *G06Q 10/06* (2013.01)

(58) Field of Classification Search
CPC ......... G06F 8/60; G06F 8/61; G06F 9/44505; G06F 8/65; G06F 9/4411
USPC ......................................... 717/174
See application file for complete search history.

(56) References Cited

U.S. PATENT DOCUMENTS

| 7,082,454 B1 | 7/2006 | Gheith |
| 7,107,589 B1 | 9/2006 | Tal |

(Continued)

FOREIGN PATENT DOCUMENTS

EP 1443700 8/2004

*Primary Examiner* — Li B Zhen
*Assistant Examiner* — Arshia S Kia
(74) *Attorney, Agent, or Firm* — Whitham, Curtis, Christofferson & Cook, P.C.; Janice Kwon

(57) ABSTRACT

A system and method allow a user to extract the set of customizations performed on an application and use these to estimate the time and effort and cost of (a) migrating to a new version of the application and/or (b) consolidating systems. The user can browse the extracted data and select configuration elements for re-use. After downloading the one or more configurations and comparing them, the user selects elements of the configurations for re-use. The first step is to scan one or more application systems and extract the configuration data using a surveyor. The method according to the invention automatically identifies configuration differences. The user then selects configuration elements for re-use. A graphic user interface (GUI) can be provided which allows the user to make these selections by dragging and dropping selected elements to a "To Be" configuration. The selected configurations are then uploaded and installed on an instance of the application.

17 Claims, 16 Drawing Sheets

Process for creating new system configurations through drag&drop and deletion operations

(56) References Cited

U.S. PATENT DOCUMENTS

| | | | |
|---|---|---|---|
| 7,802,246 B1* | 9/2010 | Kennedy et al. | 717/173 |
| 7,831,959 B1* | 11/2010 | Perry et al. | 717/121 |
| 2002/0129352 A1* | 9/2002 | Brodersen et al. | 717/174 |
| 2002/0144254 A1 | 10/2002 | Owada | |
| 2002/0154555 A1* | 10/2002 | Krueger et al. | 365/200 |
| 2003/0225927 A1* | 12/2003 | Goodman et al. | 709/320 |
| 2004/0039989 A1* | 2/2004 | Warren | 715/505 |
| 2004/0194079 A1* | 9/2004 | Nguyen et al. | 717/168 |
| 2005/0223372 A1 | 10/2005 | Borcher | |
| 2005/0262499 A1* | 11/2005 | Read | 717/172 |
| 2006/0041881 A1 | 2/2006 | Adkasthala | |
| 2006/0242207 A1 | 10/2006 | Tsyganskiy | |
| 2006/0288344 A1* | 12/2006 | Brodersen et al. | 717/168 |
| 2007/0005618 A1* | 1/2007 | Ivanov et al. | 707/100 |
| 2007/0157192 A1* | 7/2007 | Hoefler et al. | 717/168 |
| 2007/0169111 A1* | 7/2007 | Block et al. | 717/174 |
| 2007/0266054 A1* | 11/2007 | Stephens et al. | 707/200 |
| 2008/0040714 A1* | 2/2008 | Wheeler et al. | 717/174 |
| 2008/0082987 A1* | 4/2008 | Mao et al. | 719/313 |
| 2009/0037898 A1* | 2/2009 | Belisario et al. | 717/169 |
| 2009/0178034 A1* | 7/2009 | Stern et al. | 717/174 |

* cited by examiner

Fig 1. The main modules of the system

Fig. 2 Process for scanning a system (business application)

Fig. 3 Process for identifying differences

Fig. 4 Process for creating new system configurations through drag&drop and deletion operations

```xml
<java version="1.5.0" class="java.beans.XMLDecoder">
<string>IMGNODE</string>
<string>1</string>
<array class="com.ibm.real.surveyor.ws.client.AttributeType" length="5">
  <void index="0">
    <object class="com.ibm.real.surveyor.ws.client.AttributeType">
      <void property="name"><string>title</string></void>
      <void property="value"><string>Enterprise Structure</string></void>
    </object>
  </void>

<void index="1">
    <object class="com.ibm.real.surveyor.ws.client.AttributeType">
      <void property="name"><string>structureNodeType</string></void>
      <void property="value"><string/></void>
    </object>
  </void>

<void index="2">
    <object class="com.ibm.real.surveyor.ws.client.AttributeType">
      <void property="name"><string>structureNodeTypeText</string></void>
      <void property="value"><string/></void>
    </object>
  </void>

<void index="3">
    <object class="com.ibm.real.surveyor.ws.client.AttributeType">
      <void property="name"><string>index</string></void>
      <void property="value"><string>1</string></void>
    </object>
  </void>

<void index="4">
    <object class="com.ibm.real.surveyor.ws.client.AttributeType">
      <void property="name"><string>T_NodeChildren</string></void>
      <void property="value"><string>2</string></void>
    </object>
  </void>
</array>
</java>
```

FIG. 16

SYSTEM AND METHOD FOR APPLICATION CONFIGURATION COMPARISON AND REUSE

CROSS-REFERENCE TO RELATED APPLICATIONS

This application is a continuation of U.S. patent application Ser. No. 12/043,440 filed Mar. 6, 2008.

BACKGROUND OF THE INVENTION

1. Field of the Invention

The present application generally relates to computer software application configuration comparison and reuse and, more particularly, to upgrading, migrating and consolidation of business applications.

2. Background Description

Many businesses rely on business applications software to support core business processes, from financials and purchasing to inventory, production, and human resource management. Many of these applications grew out of Enterprise Resource Planning and are referred to as ERP systems, although they cover most business activities. The primary vendors of such business applications are SAP, Oracle (including recently acquired Peoplesoft, Siebel, and JD Edwards), and Lawson. The process of implementing these business applications is long and expensive and requires expertise both in industry specific business processes and in the business applications themselves. Some businesses are implementing packaged business applications for the first time, while other businesses have some business applications already implemented and are looking to consolidate, upgrade and extend these applications.

The present invention focuses on the businesses that are looking to consolidate multiple instances of a business application into a single instance, upgrade from and older version of the business application to a newer version, and extend their business application with additional functionality which might already be implemented into a different instance of the same business application. In order to achieve such consolidations, upgrades or extensions, businesses need to understand how their business applications were customized by comparing their instance of the business application with an unmodified instance, extracting the differences, analyzing them, and re-using only those differences that are needed. The main challenges in comparing instances of business applications and re-using parts of the business application include the following:

1. The complexity of the business application makes it very difficult to compare and analyze existing instances.
2. Most business applications require continuous access.
3. Extracting the useful parts of a business application and re-using them in a new instance of the business application is time consuming and requires expert knowledge.

There are a number of tool vendors that address parts of the problem, but their focus is primarily on reporting on existing system configuration. These solutions can not handle the migration and consolidation of existing customizations, because they do not provide any support for comparing instances of business applications and re-using the important parts of the business application.

SUMMARY OF THE INVENTION

According to the present invention, there is provided a system and method that allow a user to extract the set of customizations performed on an application and use these to estimate the time and effort and cost of (a) migrating to a new version of the application and/or (b) consolidating systems. In addition, the user can browse the extracted data and select configuration elements for reuse. After downloading the one or more configurations and comparing them, the user selects elements of the configurations for reuse. Optionally, the user can add additional configuration elements from a repository. In the end, these selected elements are used to configure an instance of the application.

In the practice of the invention, the first step is to scan one or more application systems and extract the configuration data using a surveyor, such as the IBM Surveyor. The method according to the invention automatically identifies configuration differences. The user is then allowed to select configuration elements for reuse. For example, a graphic user interface (GUI) can be provided which allows the user to make these selections by dragging and dropping selected elements to a "To Be" configuration. The selected configurations are then uploaded and installed on an instance of the application.

BRIEF DESCRIPTION OF THE DRAWINGS

The foregoing and other objects, aspects and advantages will be better understood from the following detailed description of a preferred embodiment of the invention with reference to the drawings, in which:

FIG. 16 is an example of node metadata.

DETAILED DESCRIPTION OF A PREFERRED EMBODIMENT OF THE INVENTION

The preferred embodiment of the invention is implemented specifically for SAP business applications software, but it will be understood by those skilled in the art that business applications software from other vendors and providers may be used in the practice of the invention. SAP is a supplier of business software applications, and IBM is a manufacturer of computers and business solutions. SAP and IBM provide collaborative business services to a variety of businesses.

Figure 1:
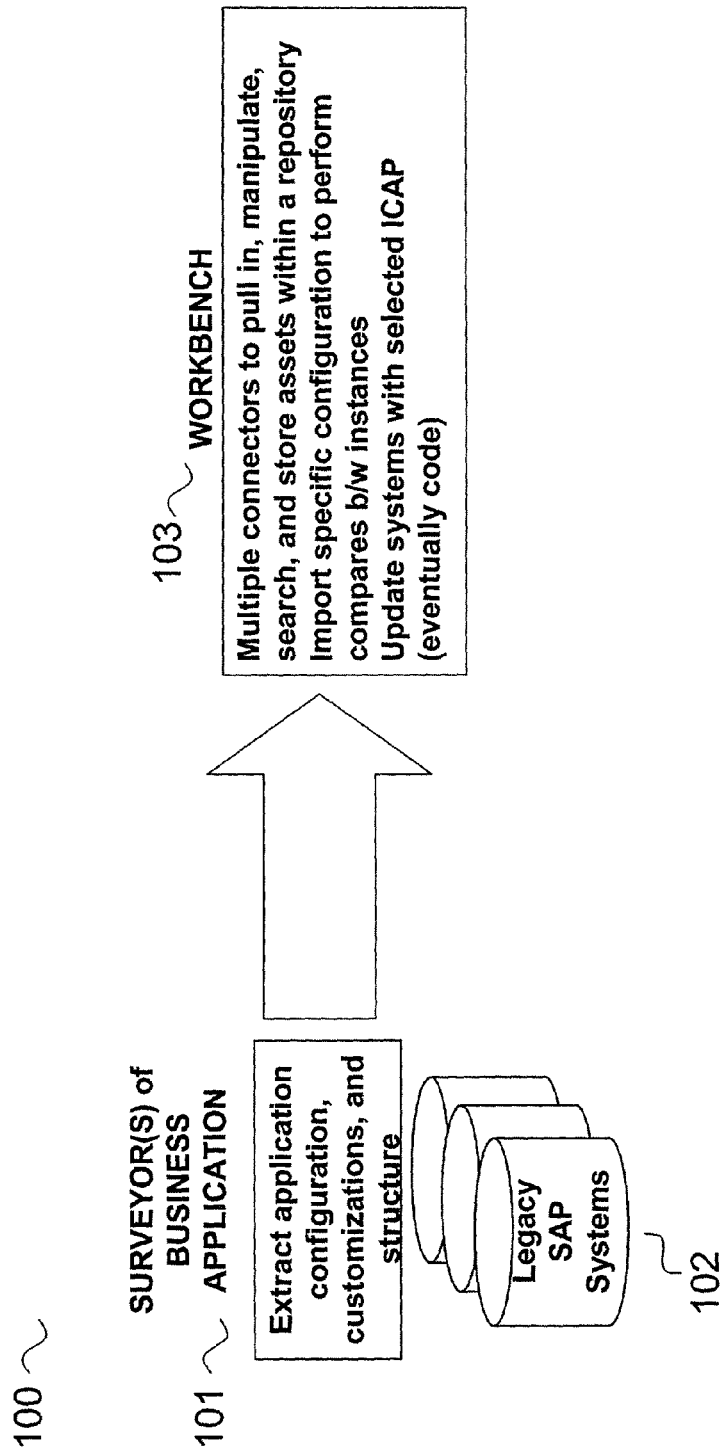
FIG. 1 is a block diagram which illustrates the main modules of the system according to a preferred embodiment of the invention.

Referring now to the drawings, and more particularly to FIG. 1, there is illustrated in block diagram form the main modules the system 100 on which the invention is implemented. These main modules include one or more surveyors 101 which access one or more business systems 102 and save the extracted data in a workbench 103. In the preferred embodiment, the business systems 102 contain legacy SAP systems and the surveyors are instances of the IBM Surveyor. The surveyors 101 extract application configuration, customizations and structure from the legacy SAP systems and this information is provided to the workbench 103, such as the IBM SAP Solution Workbench product. The workbench 103 provides multiple connectors to pull in, manipulate, search, store and push out assets from/to both the SAP system and a repository. The workbench 103 can import specific configurations to perform comparisons between instances. The workbench 103 allows users to modify extracted application configurations by adding/removing documents, ICAP (intellectual capital), configuration scripts (BSCets), and eventually code. The user starts the workbench 103 and extracts the Business Process Hierarchy (BPH) from the SAP Solution Manager 1-2 by communicating through Web services with the IBM Surveyor 101 and then downloads the actual data. In addition, the workbench 103 can also connect to actual SAP systems 102 and extract custom code or IMGs (Implementation Guides).

Figure 2:
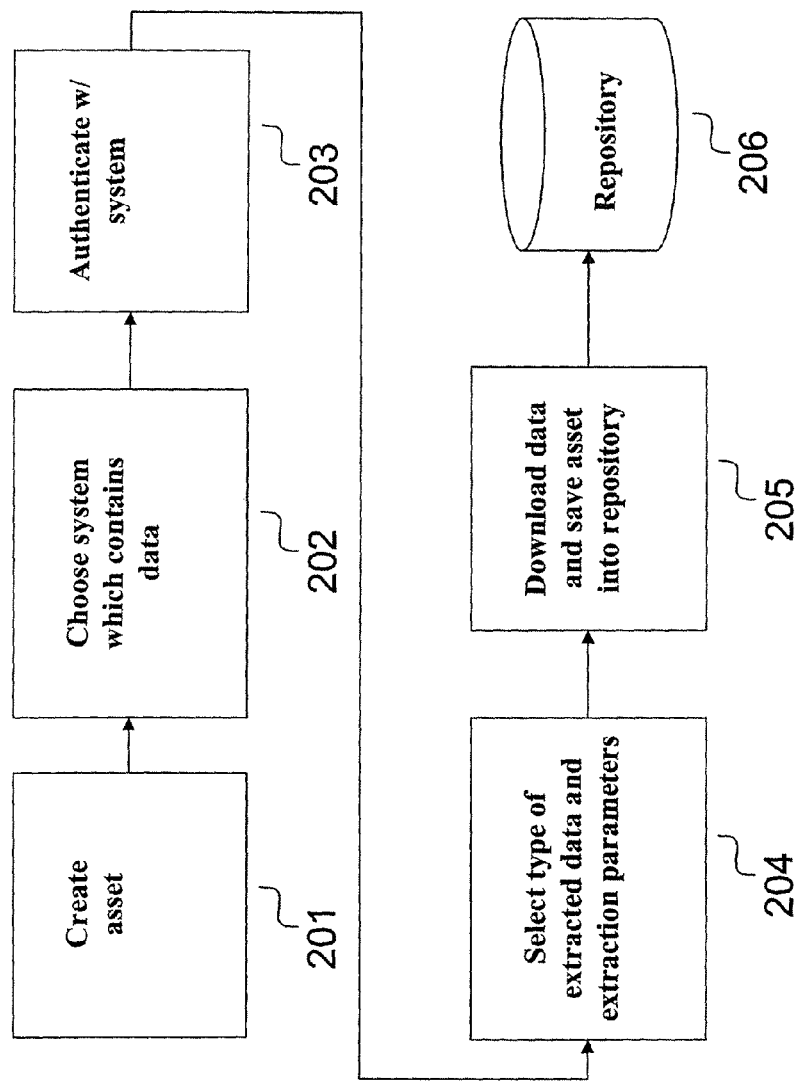
FIG. 2 is a flow diagram which illustrates the process for scanning a system or business application.

The process for scanning a system business application is shown in FIG. 2. The process begins by the user creating an asset that will hold the data in step 201, selecting the system which contains data in step 202, and authenticating with the system in step 203. The user then selects the type of extracted data and extraction parameters in step 204. The data types include IMG, BPH and custom code. The data is then downloaded and saved into the asset in step 205. Then the asset is saved into a repository 206.

Figure 3:
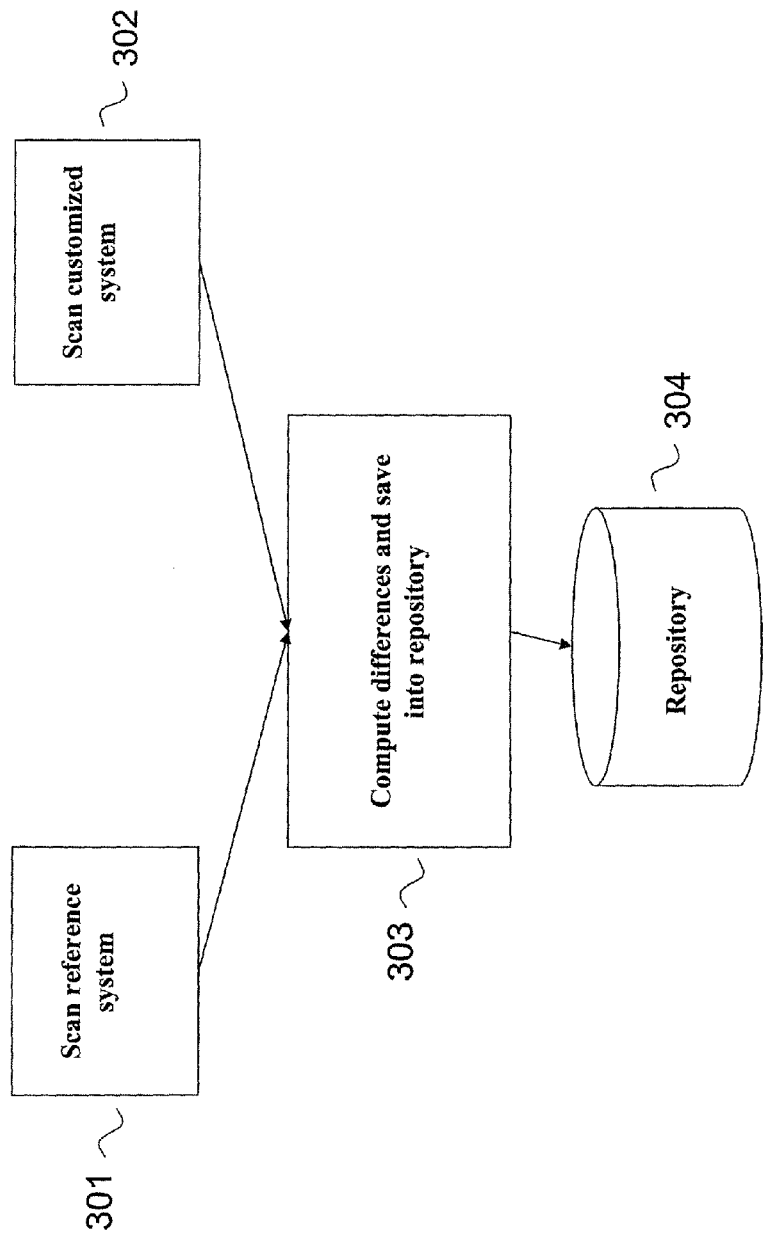
FIG. 3 is a flow diagram which illustrates the process for identifying differences.

The process for identifying differences is shown in FIG. 3. In order to compute the differences between two application configurations, two BPHs, or two sets of custom code, the user must first download the two assets to be compared. The BPH/IMG/custom code from the reference system is scanned in step 301, while the BPH/IMG/custom code from the customized system is scanned in step 302. The two scanned application configurations are compared in step 303. The computed differences are saved in a repository in step 304. The compare method looks first at the structure of the two assets, and triggers any differences in structure. If the structures are identical, the compare method compares the actual data. In this embodiment, the data is downloaded directly in the file system as a set of folders and eXtensible Markup Language (XML) files, where all the relationships between SAP entities are being captured as static relationships between folders and files. For example, a business process defining a set of business steps will be represented as a folder containing a set of folders, where each child folder defines a business step. Thus, the compare method can use the XML structure to compute the data differences.

Figure 4:
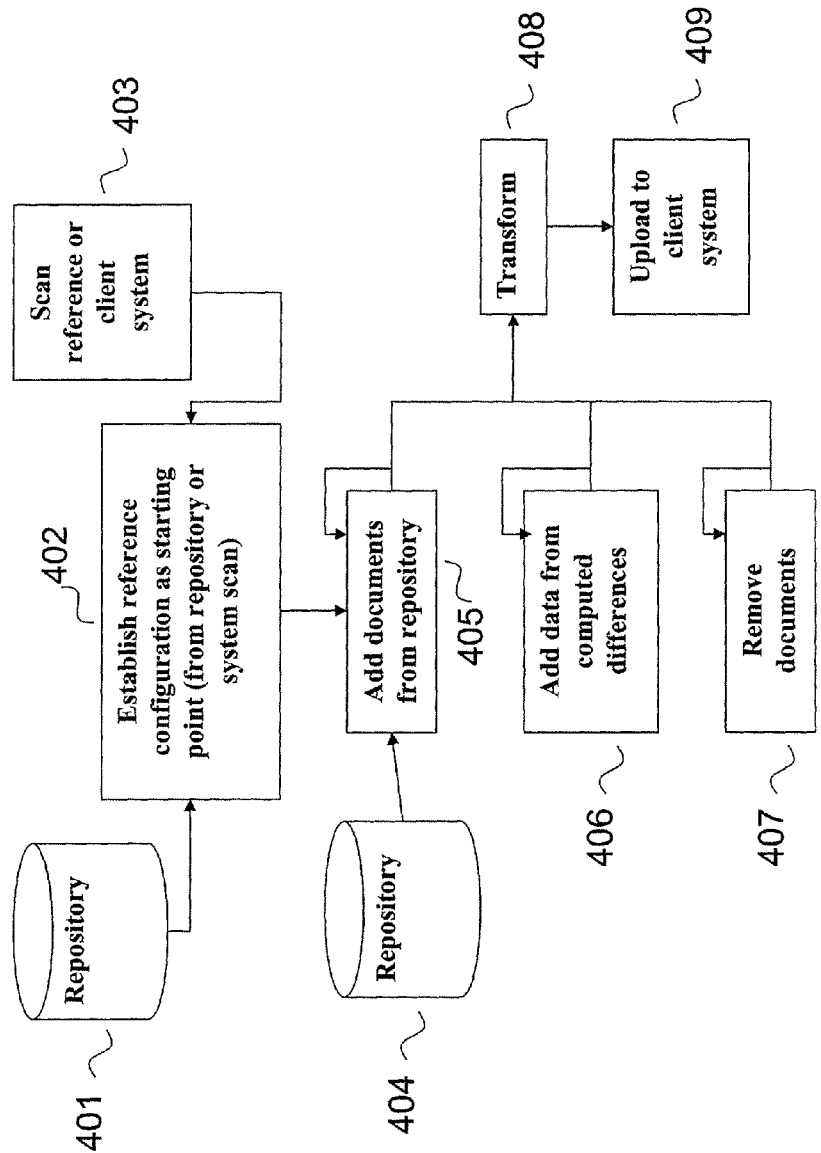
FIG. 4 is a flow diagram which illustrates the process for creating new system configurations through drag and drop and deletion operations.

Once all of the content is brought into the workbench 103, users (e.g., practitioners and clients) will add content to the BPH structure extracted from the Solution Manager. This is done by dragging and dropping Intellectual Capital (ICAP), SAP Best Practice Content, and customer content (IMG or custom code) into the extracted BPH. Once the BPH structure has been updated with all applicable content, it will be uploaded back to the Solution Manager, as shown in FIG. 4. Initially, a user will connect to the SAP Solution Manage 102 and extract the client BPH instep 403. This BPH is the "AS-IS" version of BPH and reflects the current status of the business application. Next, the user extracts the reference BPH from a repository 401 and uses this reference BPH as the starting point in step 402. The user customizes the reference BPH by repeatedly adding documents from a repository 404 in step 405, adding data computed from comparing assets (IMGs, BPHs, or custom code) in step 406, or removing documents in step 407. Once the user finishes executing all customizations, the final BPH is then transformed in step 408 and uploaded to the client SAP Solution Manager in step 409.

Figure 5:
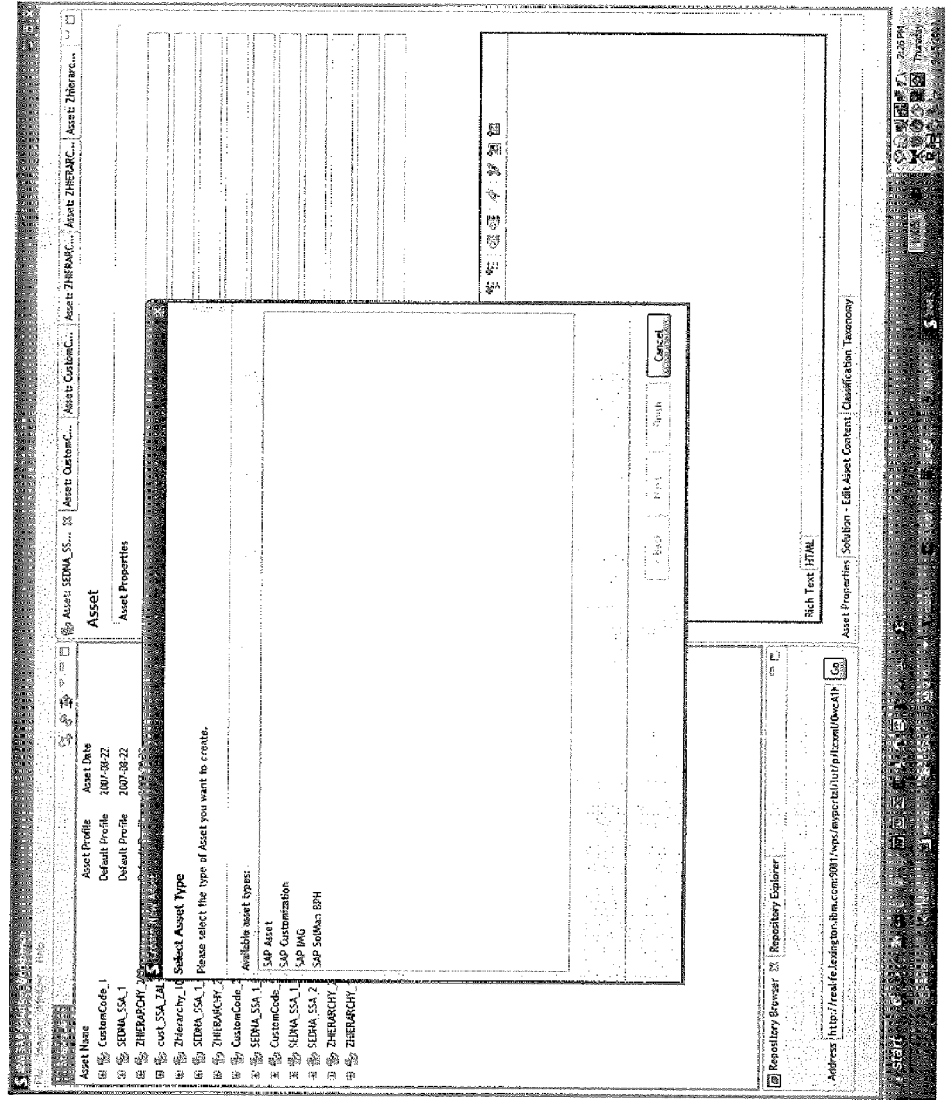
FIG. 5 is a screen print which illustrates the graphic user interface (GUI) for creating an asset, and in particular choosing asset type.
Figure 6:
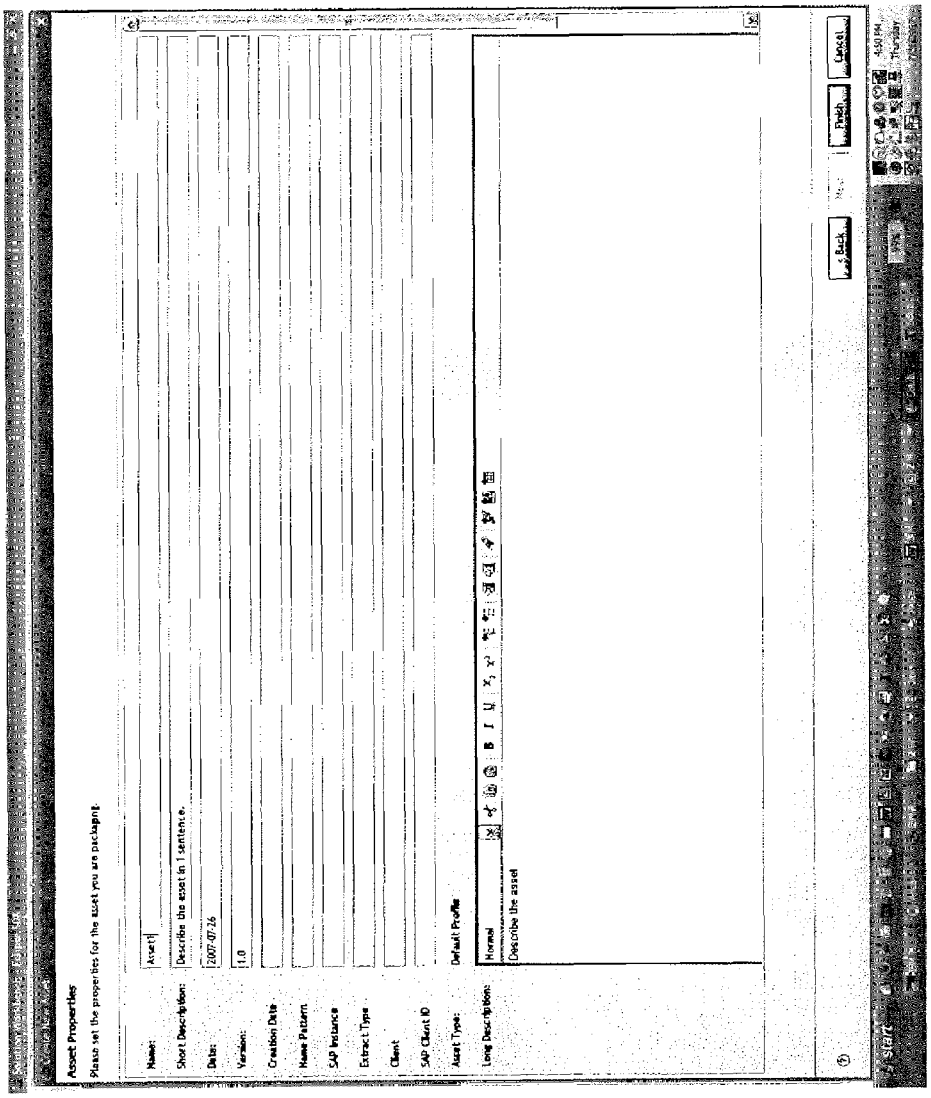
FIG. 6 is a screen print which illustrates the GUI (Graphic User Interface) for creating an asset, and in particular entering asset characteristics.
Figure 7:
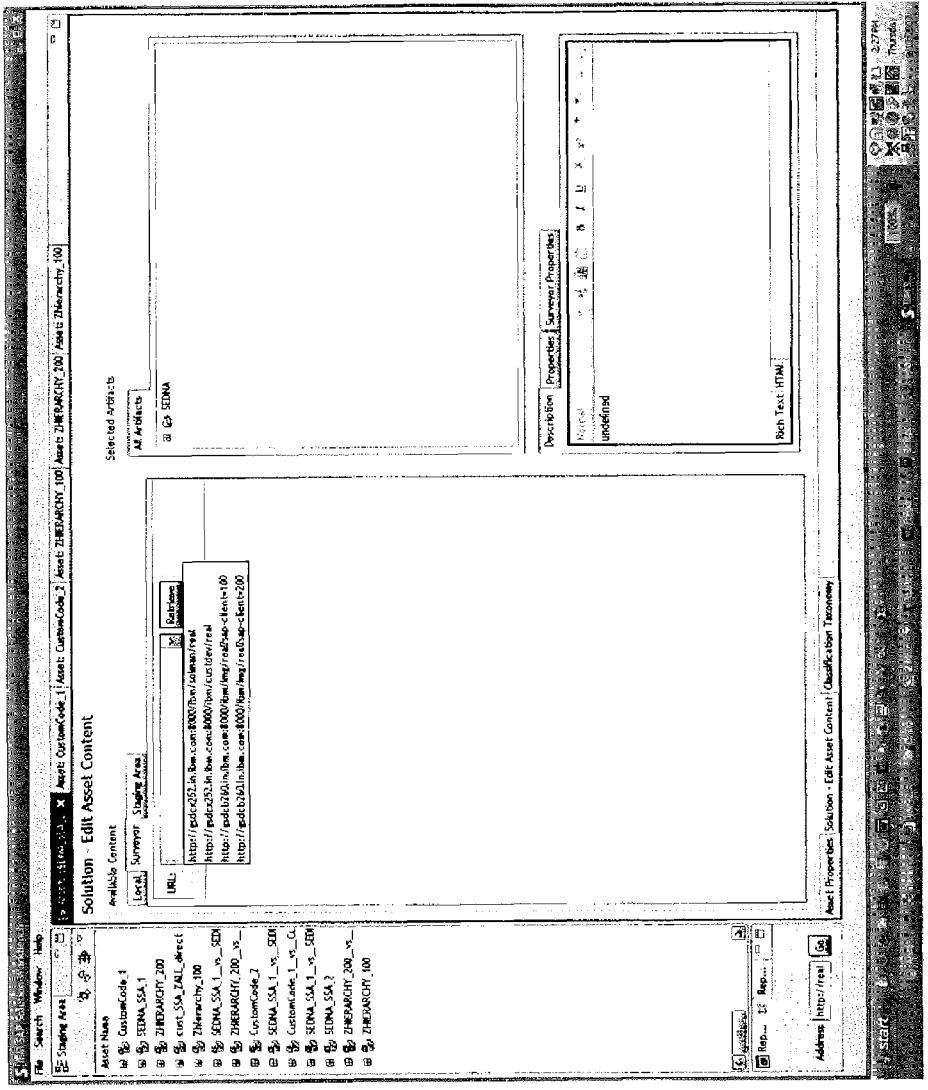
FIG. 7 is a screen print which illustrates the GUI for user selection of an SAP system or SAP Solution Manager where IBM Surveyor is running.
Figure 8:
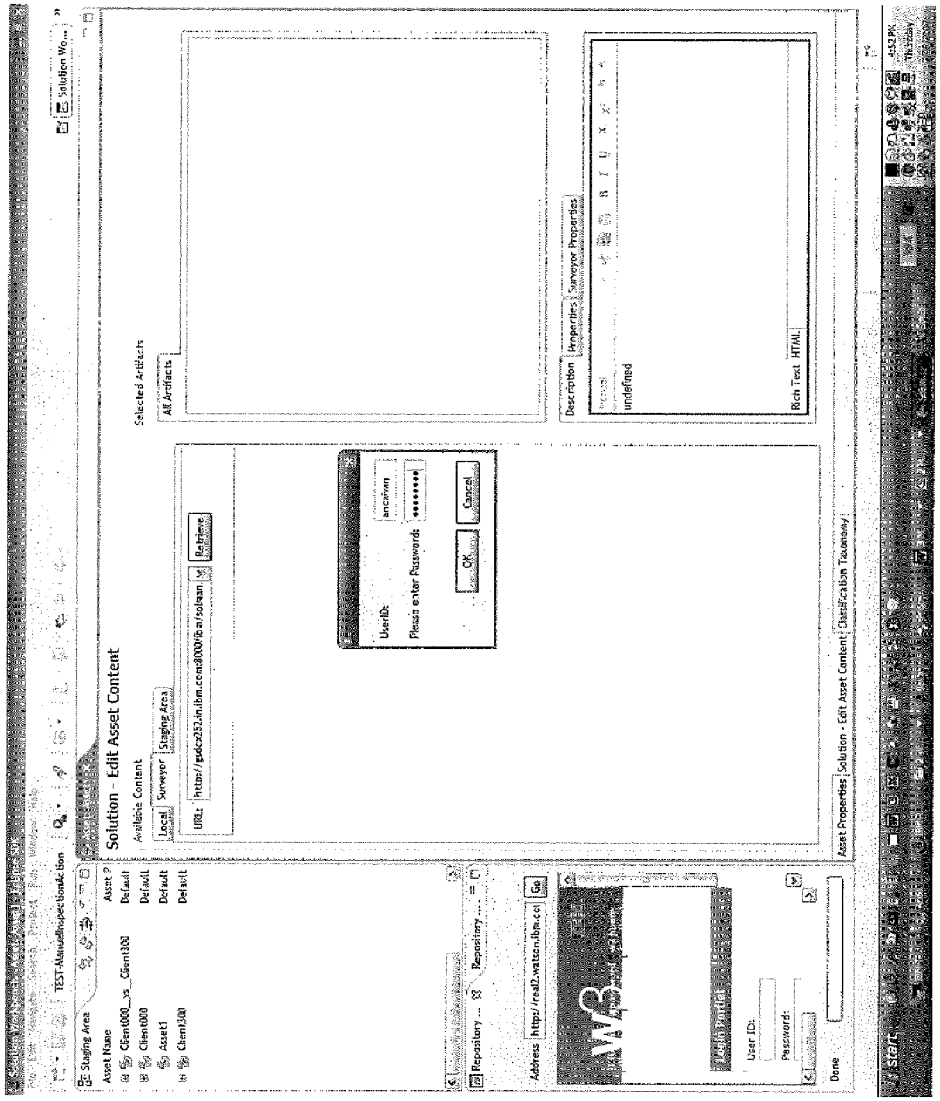
FIG. 8 is a screen print which illustrates the GUI for authentication with the IBM Surveyor, before downloading data.
Figure 9:
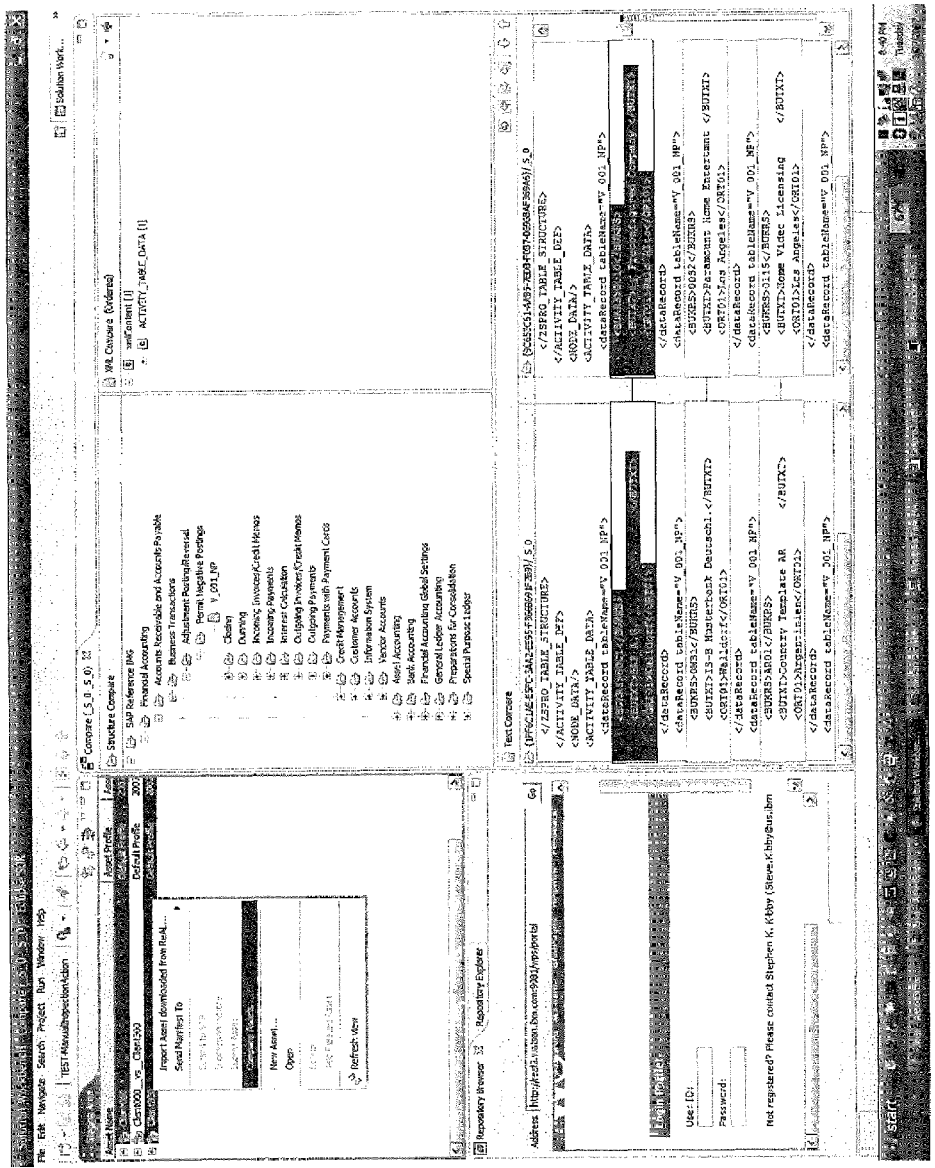
FIG. 9 is a screen print which illustrates the GUI of an example of a compare result between two IMGs (Implementation Guides)

FIGS. 5 to 9 represent snapshots of the implementation of the system described for the preferred embodiment of the invention. FIG. 5 shows the beginning of the asset creation process, where the user is allowed to select the type of the asset (e.g., SAP IMG, SAP BPH, SAP custom code, or ICAP). Once the user selects a type, the user can enter all asset properties, as shown in FIG. 6. Some of the properties include the name of the asset, a short description, the date, the version, and others. After the asset is created, the user can select the source of the extraction process; i.e., the SAP Solution Manager or SAP system that contains the data, as shown in FIG. 7. The workbench 103 communicates with the IBM Surveyor 101 running on the source IBM Solution Manager or SAP system and extracts the data. As part of this step, the user is asked to authenticate with the source system, as shown in FIG. 8. Once the user downloads several application configurations, the user can compute the customization by running the compare method. FIG. 9 shows a subset of the compare result computed after comparing two IMGs. The viewer is divided into two parts, each side showing the differences of each IMG.

Figure 10:
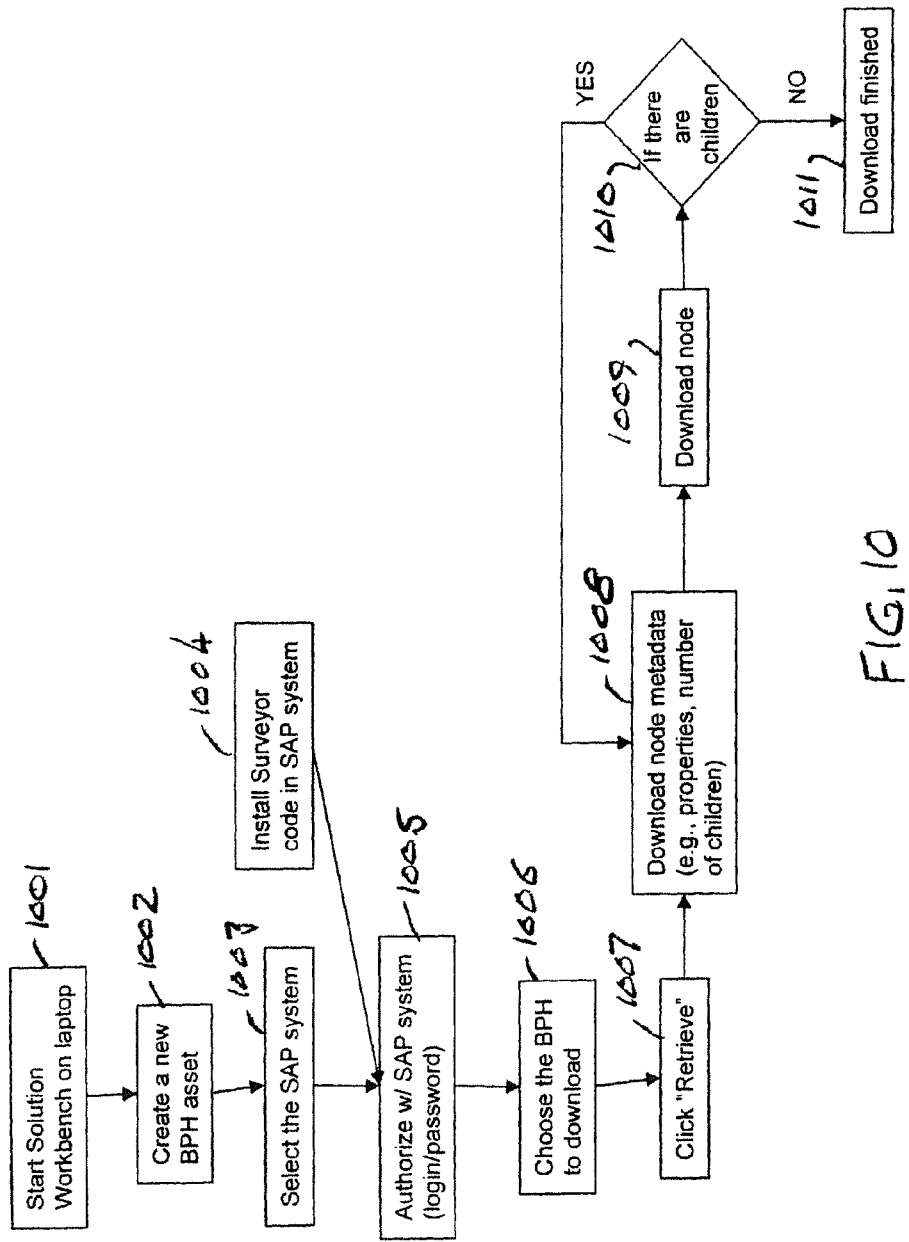
FIG. 10 is a flow diagram illustrating the logic of the download process of a BPH (Business Process Hierarchy) using the solution Workbench.

FIG. 10 provides an illustration of the logic of the process of downloading a BPH using the solution Workbench 103. The process begins by starting the solution Workbench application on a laptop computer in function block 1001. A new BPH asset is created in function block 1002. Next, the user selects the SAP system in function block 1003. The Surveyor code is installed n the selected SAP system in function block 1004. The user then enters a login/password to be authorized by the SAP system in function block 1005, and in function block 1006, the user chooses a BPH to download. The user clicks "Retrieve" in function block 1007, which initiates the download process. In function block 1008, node metadata (e.g., properties, number of children, etc.) is downloaded. Each node is downloaded in function block 1009, and the downloaded node is examined to determine if there are any children of the node in decision block 1010. If there are, the process loops back to function block 1008; otherwise, the download is completed at function block 1011.

Figure 11:
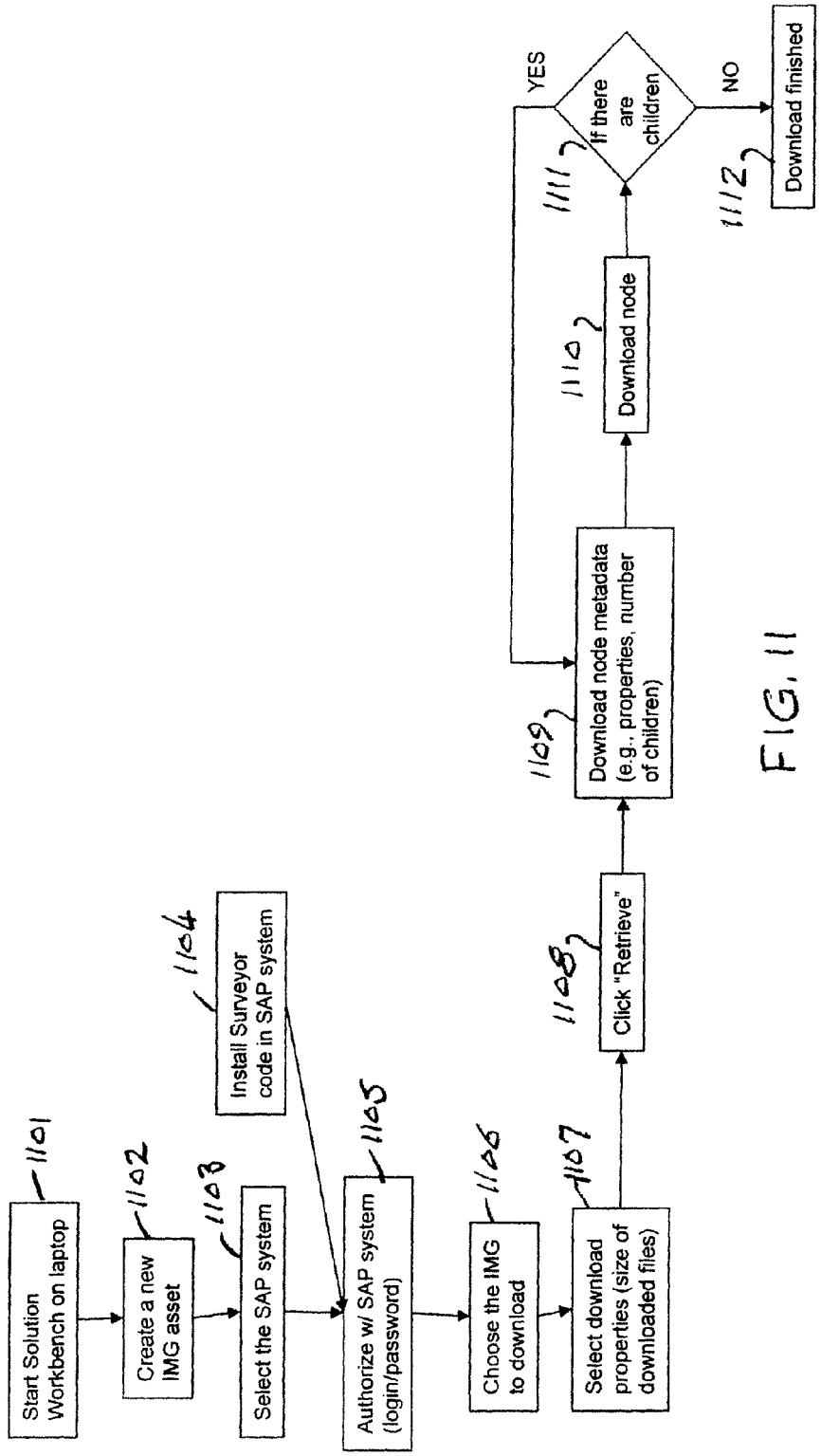
FIG. 11 is a flow diagram illustrating the logic of the download process of an IMG using the solution Workbench.

A similar process is used to download an WIG using the solution Workbench, as shown in FIG. 11. The process begins by starting the solution Workbench application on a laptop computer in function block 1101. A new IMG asset is created in function block 1102. Next, the user selects the SAP system in function block 1103. The Surveyor code is installed n the selected SAP system in function block 1104. The user then enters a login/password to be authorized by the SAP system in function block 1105, and in function block 1106, the user chooses an IMG to download. Next, the user chooses download properties (size of downloaded files) in function block 1107. The user clicks "Retrieve" in function block 1108, which initiates the download process. In function block 1109, node metadata (e.g., properties, number of children, etc.) is downloaded. Each node is downloaded in function block 1110, and the downloaded node is examined to determine if there are any children of the node in decision block 1111. If there are, the process loops back to function block 1109; otherwise, the download is completed at function block 1112.

Figure 12:
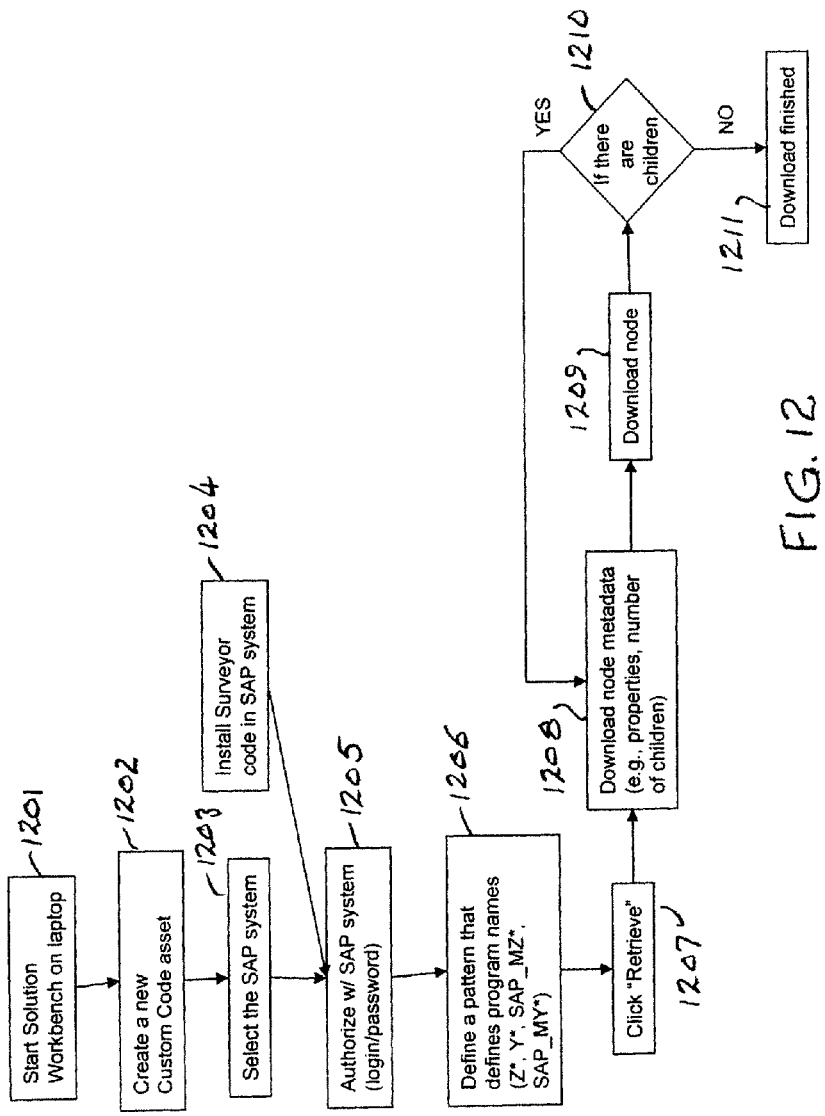
FIG. 12 is a flow diagram illustrating the logic of the download process of custom code using the solution Workbench.

The process for downloading custom code using the solution Workbench 103 is similar, as shown in FIG. 12. The process begins by starting the solution Workbench application on a laptop computer in function block 1201. A new custom code asset is created in function block 1202. Next, the user selects the SAP system in function block 1203. The Surveyor code is installed n the selected SAP system in function block 1204. The user then enters a login/password to be authorized by the SAP system in function block 1205, and in function block 1006, the user defines a pattern that defines program names (Z*, Y*, SAP_MZ*, SAP_MY*) to download. The user clicks "Retrieve" in function block 1207, which initiates the download process. In function block 1208, node metadata (e.g., properties, number of children, etc.) is downloaded. Each node is downloaded in function block 1209, and the downloaded node is examined to determine if there are any children of the node in decision block 1210. If there are, the process loops back to function block 1008; otherwise, the download is completed at function block 1211.

Figure 13:
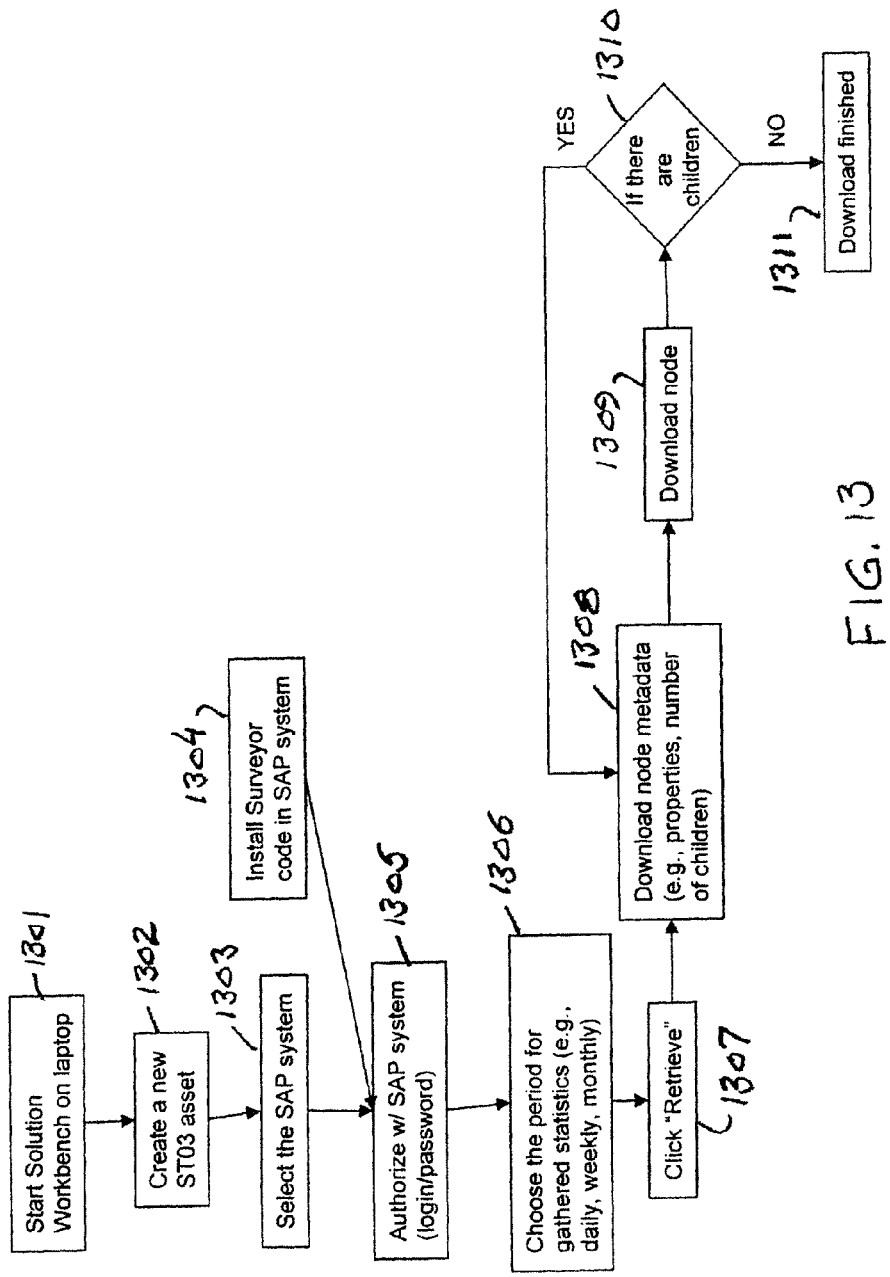
FIG. 13 is a flow diagram illustrating the logic of the download process of ST03 data using the solution Workbench.

Again, the process for downloading ST03 data (SAP statistical data about data/process/code usage) using the solution Workbench 103 is similar, as shown in FIG. 13. The process begins by starting the solution Workbench application on a laptop computer in function block 1301. A new ST03 asset is created in function block 1302. Next, the user selects the SAP system in function block 1303. The Surveyor code is installed n the selected SAP system in function block 1304. The user then enters a login/password to be authorized by the SAP system in function block 1305, and in function block 1306, the user chooses the period for gathered statistics (e.g., daily, weekly, monthly) to download. The user clicks "Retrieve" in function block 1307, which initiates the download process. In function block 1308, node metadata (e.g., properties, number of children, etc.) is downloaded. Each node is downloaded in function block 1309, and the downloaded node is examined to determine if there are any children of the node in decision block 1310. If there are, the process loops back to function block 1008; otherwise, the download is completed at function block 1311.

Figure 14:
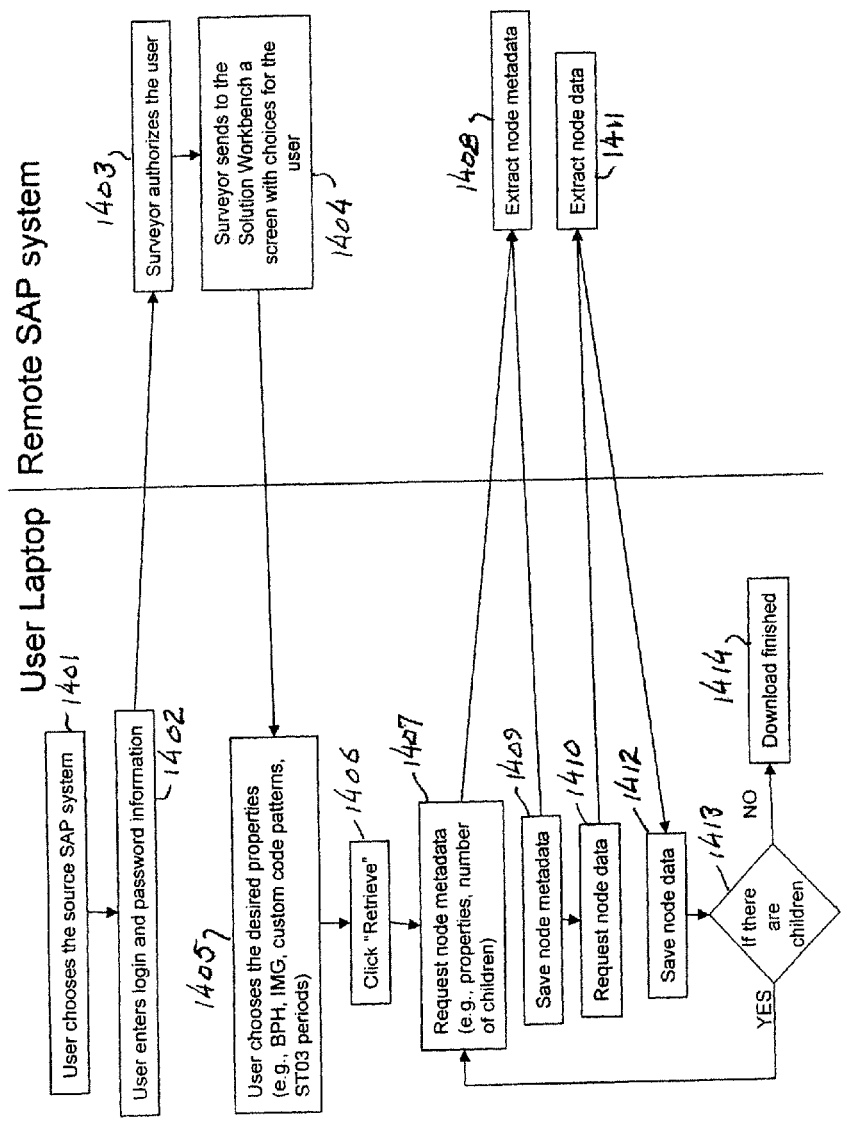
FIG. 14 is a data flow diagram illustrating the interaction between the solution Workbench and the Surveyor during downloads.

The interaction between the solution Workbench 103 and the Surveyor 101 during downloads is illustrated by the data flow diagram of FIG. 14. This figure is divided into steps on the left side at the user laptop computer and the right side for the remote SAP system. Beginning at step 1401, the user chooses the source SAP system using the user laptop computer. The user then enters login and password information at step 1402. On the remote SAP system side, the Surveyor authorizes the user at step 1403. Then, at step 1404, the Surveyor sends to the solution Workbench a screen with choices for the user. Back at the user laptop side, the user chooses the desired properties (e.g., BPH, IMG, custom code patterns, ST03 periods) at step 1405. The user then clicks "Retrieve" at step 1406. This initiates the download process, which begins with step 1407, where a request is made to the remote SAP system for node metadata (e.g., properties, number of children, etc.). In response to this request, at step 1408 on the remote SAP side, the node metadata is extracted and returned to the user laptop computer. At step 1409 the returned node metadata is saved, and then at step 1410, a request is made to the remote SAP system for node data. In response to this request, at step 1411 on the remote SAP side, the node data is retrieved and returned to the user laptop computer. At step 1412 the returned node data is saved at step 1413. The saved data is examined at step 1414 to determine if there are any children. If so, a return is made to step 1407 to request node metadata; otherwise, the download is finished at step 1415.

Figure 15:
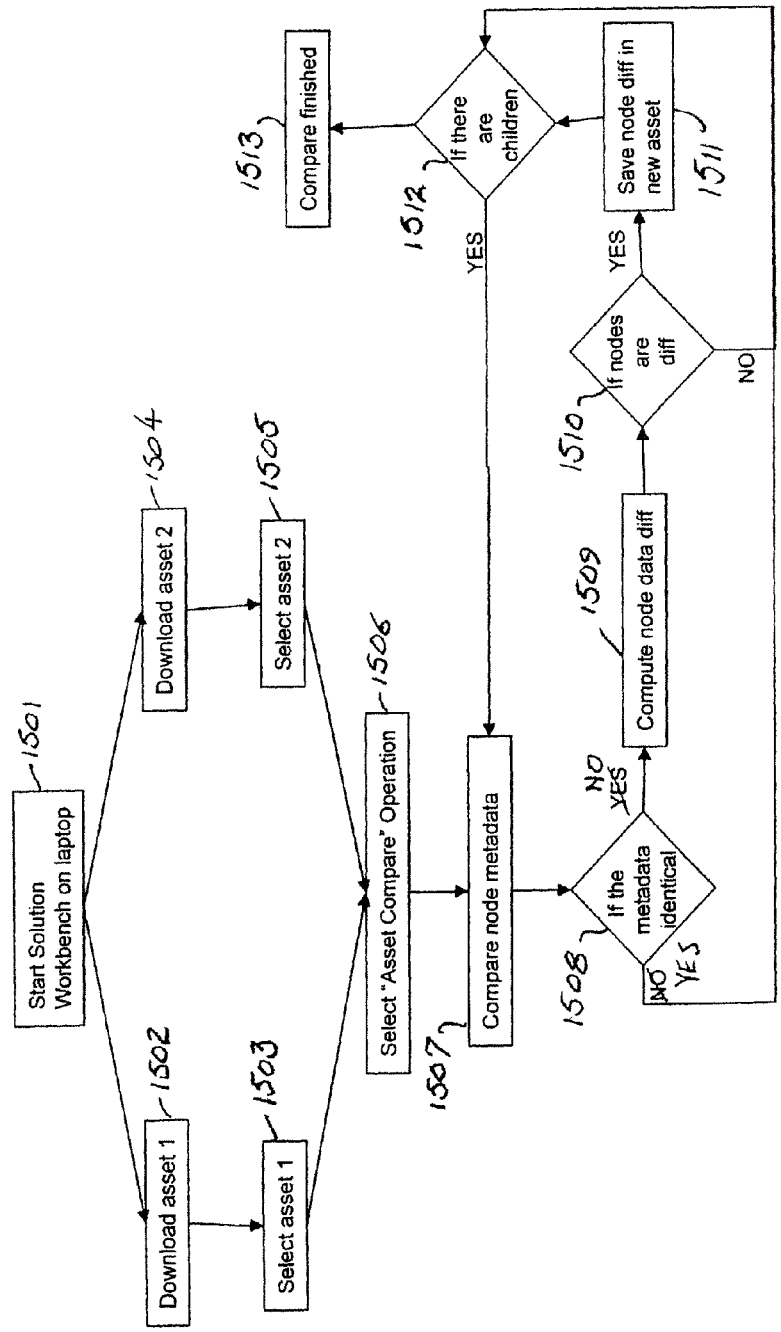
FIG. 15 is a flow diagram illustrating the logic of the process of comparing two assets using the solution Workbench.

FIG. 15 illustrates the process of comparing two assets (BPHs, IMGs, Custom Code, ST03) using the solution Workbench 103. The solution Workbench application is started on the laptop computer in function block 1501. Then in function block 1502, asset 1 is downloaded, and asset 1 is selected in function block 1503. Simultaneously in the flow, asset 2 is downloaded in function block 1504, and asset 2 is selected in function block 1505. Then, in function block 1506, the "Asset Compare" operation is selected by the user. In response, the metadata of the two assets are compared in function block 1507. A determination is made in decision block 1508 as to whether the compared metadata is identical. If they are identical, node difference data is computed in function block 1509. Next, a determination is made in decision block 1510 as to whether the nodes are different. If so, the node difference is saved in a new asset in function block 1511. If the metadata is not identical, as determined in decision block 1508, or if the nodes are the same, as determined in decision block 1510, then the process goes to decision block 1512 together with the output of function block 1511. In decision block 1512, a determination is made as to whether there are any children. If so, the process loops back to function block 1507; otherwise, the compare is finished in function block 1513.

An example o the node metadata (i.e., node properties) is shown in FIG. 16. The main properties saved as part of the node metadata are:

Title
Structure node type
Structure node type text
Index
Number of children

While the invention has been described in terms of a single preferred embodiment, those skilled in the art will recognize that the invention can be practiced with modification within the spirit and scope of the appended claims. In particular, the invention has been described in terms of the preferred embodiment for SAP business applications software, but the invention may be practiced with other business applications software.

Having thus described our invention, what we claim as new and desire to secure by Letters Patent is as follows:

1. A system for application configuration comparison and re-use, comprising:
   a surveyor configured to i) receive a first user selection of one or more data types, ii) scan an application system, and iii) extract application configuration elements having said one or more data types specified by said first user selection, wherein said application system is an Enterprise Resource Planning (ERP) system, wherein scanning the application system with the surveyor comprises:

creating an asset that will hold data; followed by
selecting a system that contains data; followed by
authenticating with the system; followed by
selecting a type of extracted data and extraction parameters; followed by
downloading and saving the data into the asset; followed by
saving the asset into a repository; and
a computer with a workbench to which extracted application configuration elements from said application system are provided by the surveyor, wherein said workbench is configured to perform steps of
comparing the extracted application configuration elements with a reference system including comparison of one or more of node metadata and nodes of respective extracted application configuration elements and application configuration elements of said reference system;
computing one or more differences between the extracted application configuration elements and the reference system, wherein a) when compared node metadata from said comparing step is identical, nodes themselves are compared and node differences are computed, and b) when compared nodes are identical, said comparing step is repeated for children of said compared nodes if children exist;
receive a second user selection of one or more of the extracted application configuration elements which contain one or more of said differences computed in said computing step for re-use; and
upload said one or more of the extracted application configuration elements of said second user selection to a client system for installation,
wherein said surveyor is configured to receive said first user selection from said computer.

2. The system of claim 1, wherein the workbench provides a graphic user interface (GUI) on said computer allowing selection of configuration elements for re-use by dragging and dropping and deletion operations.

3. The system of claim 1, wherein extracted application configuration elements include one or more of Business Process Hierarchy (BPH) and Implementation Guides (IMGs).

4. The system of claim 1, wherein said workbench of said computer is further configured to
receive an additional user selection of one or more documents, intellectual capital data, configuration scripts, or custom code, and
upload configuration elements for which said one or more documents, intellectual capital data, configuration scripts, or custom code have been added or deleted.

5. A method of application configuration comparison and re-use comprising the steps of:
scanning an application system using a surveyor, including receiving through a computer a first user selection of one or more data types to extract, wherein said application system is an Enterprise Resource Planning (ERP) system, wherein the step of scanning comprises:
creating an asset that will hold data; followed by
selecting a system that contains data; followed by
authenticating with the system; followed by
selecting a type of extracted data and extraction parameters; followed by
downloading and saving the data into the asset; followed by
saving the asset into a repository;
extracting application configuration elements from said application system which have a data type of said one or more data types specified by said first user selection;
comparing in a workbench on a computer the extracted application configuration elements with a reference system including comparison of one or more of node metadata and nodes of respective extracted application configuration elements and application configuration elements of said reference system;
computing one or more differences between the extracted application configuration elements and the reference system, wherein a) when compared node metadata from said comparing step is identical, nodes themselves are compared and node differences are computed, and b) when compared nodes are identical, said comparing step is repeated for children of said compared nodes if children exist;
receiving a second user selection of one or more of the extracted configuration elements which contain one or more of said differences computed in said computing step for re-use; and
uploading and installing said one or more of the extracted configuration elements specified by said second user selection to said reference system.

6. The method of claim 5, wherein said user selection is received in said receiving step through a graphic user interface (GUI) configured to allow selection by drag and drop and deletion operations.

7. The method of claim 5, further comprising the step of downloading to said workbench a first asset containing one or more of said extracted application configuration elements and a second asset containing one or more application configuration elements of said reference system, wherein said downloading step precedes said comparing step, and
wherein said comparing step includes comparing said first asset and said second asset.

8. The method of claim 7, wherein in the downloading step, data in said first asset and data in said second asset are downloaded directly in a file system as a set of folders and XML files.

9. The method of claim 8, wherein said data in said first asset and said data in said second asset are a business process defining a set of business steps represented as a folder containing a set of folders, where each child folder defines a business step.

10. The method of claim 5, wherein said one or more data types are selected from the group consisting of Business Process Hierarchy (BPH) and Implementation Guides (IMGs).

11. The method of claim 5, wherein the application system requires continuous access and is a legacy business system.

12. The method of claim 5, wherein the application system is a business application system selected from the group consisting of a SAP system, an Oracle system, a Peoplesoft system, a Siebel system, a JD Edwards system, and a Lawson system.

13. The method of claim 5, wherein extracted application configuration elements include one or more of Business Process Hierarchy (BPH) and Implementation Guides (IMGs).

14. The method of claim 5, wherein said receiving step further comprises receiving an additional user selection of one or more documents, intellectual capital data, configuration scripts, or custom code and said uploading step further includes uploading and installing application configuration elements for which said one or more documents, intellectual capital data, configuration scripts, or custom code have been added or deleted.

15. A method of application configuration comparison and re-use comprising the steps of:
- scanning an application system using a surveyor, including receiving through a computer a first user selection of one or more data types to extract, wherein said application system is an Enterprise Resource Planning (ERP) system, wherein the step of scanning comprises:
  - creating an asset that will hold data; followed by
  - selecting a system that contains data; followed by
  - authenticating with the system; followed by
  - selecting a type of extracted data and extraction parameters; followed by
  - downloading and saving the data into the asset; followed by
  - saving the asset into a repository;
- extracting application configuration elements from said application system which have a data type of said one or more data types specified by said first user selection, extracted application configuration elements being saved in a first set of assets;
- comparing in a workbench on a computer a first asset from said first set of assets and a second asset from a second set of assets extracted from a reference application system, said step of comparing including comparison of one or more of node metadata and nodes of said first asset and said second asset;
- computing in a workbench on a computer one or more differences between said first asset and said second asset, wherein a) when compared node metadata from said comparing step is identical, nodes themselves are compared and node differences are computed, and b) when compared nodes are identical, said comparing step is repeated for children of said compared nodes if children exist;
- receiving a second user selection of at least one difference of said one or more differences; and
- uploading and installing application configuration elements containing said at least one difference specified by said second user selection to said reference application system.

16. The method of claim 15, wherein said receiving step further comprises receiving an additional user selection of one or more documents, intellectual capital data, configuration scripts, or custom code and said uploading step further includes uploading and installing application configuration elements for which said one or more documents, intellectual capital data, configuration scripts, or custom code have been added or deleted.

17. The method of claim 15, wherein said one or more data types include one or more of Business Process Hierarchy (BPH) and Implementation Guides (IMGs).

* * * * *